Oct. 30, 1962  W. S. BEACH  3,061,222
CAMERA REWIND
Filed Aug. 18, 1958  2 Sheets-Sheet 1
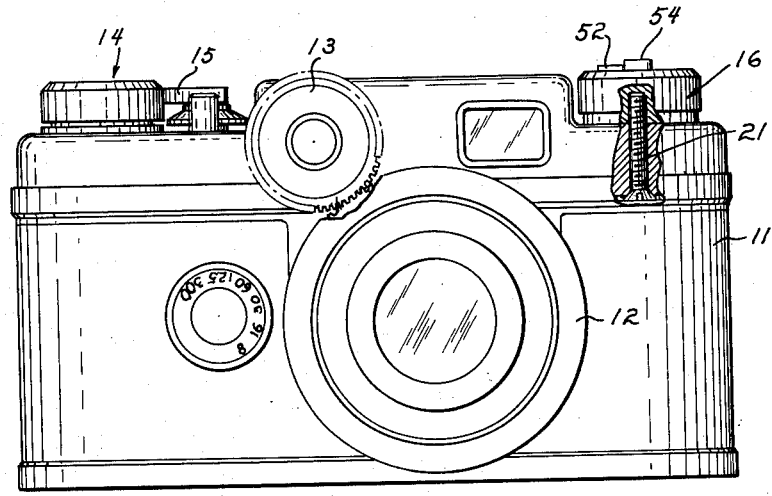
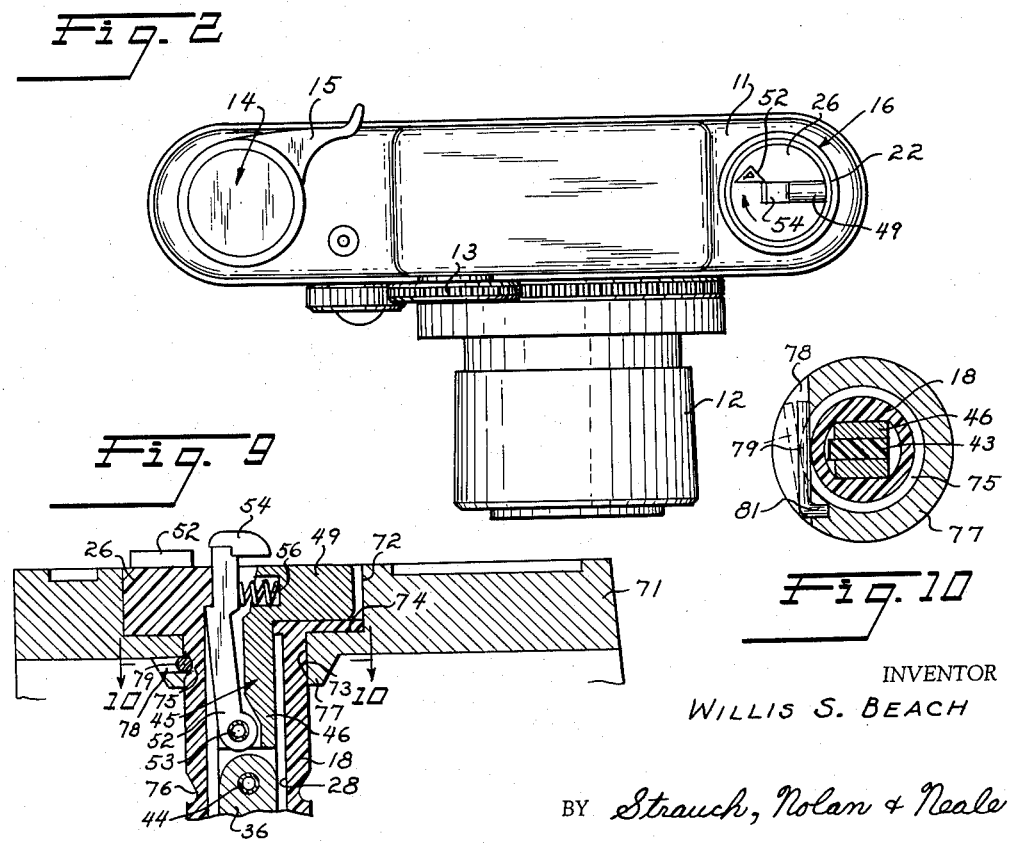
INVENTOR
WILLIS S. BEACH
BY Strauch, Nolan & Neale
ATTORNEYS

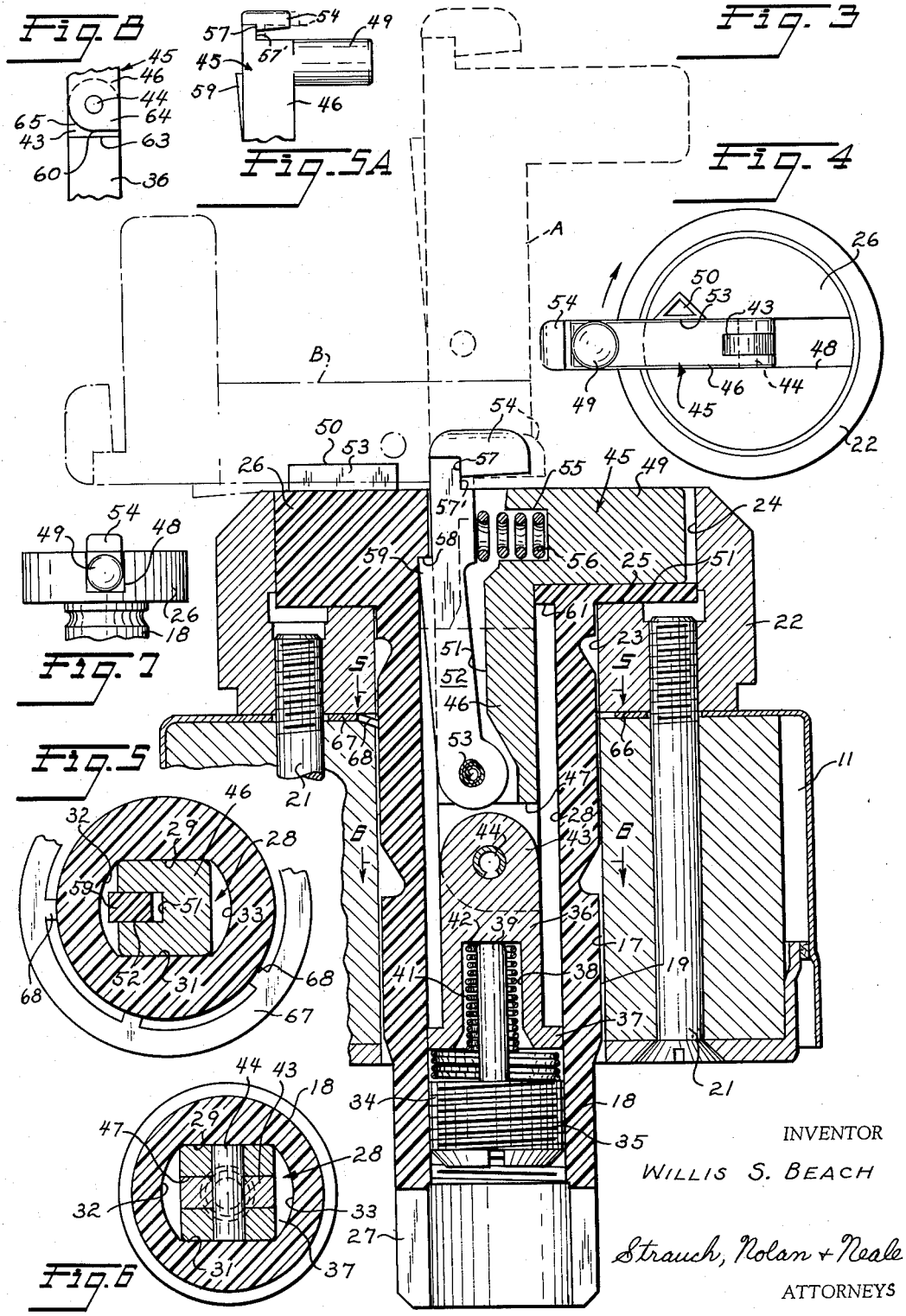

3,061,222
Patented Oct. 30, 1962

3,061,222
CAMERA REWIND
Willis S. Beach, Brighton, Mich., assignor, by mesne assignments, to Argus Incorporated, a corporation of Delaware
Filed Aug. 18, 1958, Ser. No. 755,737
12 Claims. (Cl. 242—71.3)

This invention relates to film winding mechanism for cameras and particularly to a crank rewind mechanism whereby the film in an ordinary 35 mm. camera may be speedily rewound within the cartridge after all of the film has been exposed and wound on the wind reel on the other side of the exposure aperture.

It is a major object of this invention to provide a novel film rewind mechanism for a camera.

A further object of the invention is to provide a novel crank rewind mechanism for a camera.

It is a further object of the invention to provide a novel rewind mechanism for a camera which is normally substantially concealed within the camera and which may be ejected to be accessible when the operator desires to rewind the exposed film.

It is a further object of the invention to provide a novel rewind mechanism for a camera wherein a crank normally concealed within a portion of the camera is readily spring ejected externally of the camera so that it is available for manipulation by the operator for speedily turning a spindle within the camera for rewinding the exposed film.

These and other objects of the invention will become apparent as the description proceeds in connection with the appended claims and the annexed drawings wherein:

FIGURE 1 is a front elevation of a camera containing a preferred embodiment of the invention;

FIGURE 2 is a top plan view of the camera showing especially the crank rewind in retracted position;

FIGURE 3 is an enlarged fragmentary view mainly in section showing the crank rewind mechanism in its retracted position within the camera and showing in dotted lines positions of the crank after it has been ejected for the rewinding operation;

FIGURE 4 is a top plan view of the crank rewind with the crank ejected and swung into position to start the rewind action;

FIGURE 5 is a section on line 5—5 of FIGURE 3 showing details of the rewind mechanism;

FIGURE 5A is a fragmentary elevation of the upper end of the crank;

FIGURE 6 is a section essentially on line 6—6 of FIGURE 3 showing further detail;

FIGURE 7 is a fragmentary elevation showing the retracted crank end;

FIGURE 8 is a fragmentary elevation showing the unidirectional pivot of the crank;

FIGURE 9 is a fragmentary view in section showing the invention as applied to another type of camera; and FIGURE 10 is a section on line 10—10 of FIGURE 9.

Referring to FIGURES 1 and 2 the camera body indicated at 11 supports the lens assembly 12 which is disposed before the exposure aperture and which may be manually focused by a manipulation of focusing member 13. At the left in FIGURES 1 and 2 is the wind reel area designated at 14 and having a lever 15 for rapidly advancing the film toward the wind reel within the camera. At the right in FIGURES 1 and 2 is the rewind reel area designated at 16 where the fresh cartridge of unexposed film is located within the camera and the film drawn therefrom across the exposure aperture behind the lens assembly to be wound on the wind reel at 14 during the period that the film is being exposed. After all of the film has been exposed the film is then rewound within the cartridge at the rewind area, moving from left to right in FIGURES 1 and 2, and it is the mechanism for rapidly rewinding this film into the cartridge or other reel that is the subject matter of the present invention. The reel spindles and cartridge within the camera are essentially the same as disclosed in United States Letters Patent No. 2,655,847.

Referring to FIGURE 3 particularly, the camera body 11 has in its top wall a bore 17 which is adapted to receive the hollow rewind shaft 18. Preferably this bore is cylindrical and the rewind shaft has a cylindrical portion 19 which is journalled within the bore for rotation about its axis, which axis is parallel to the plane of movement of the film past the exposure aperture. Projecting above the top wall of the camera and removably secured thereto as by screws 21 is a rigid metal collar 22 that is essentially an extension of the body and has a small inner bore 23 which is preferably the same diameter as bore 17 and serves as a substantial continuation thereof and a larger outer bore 24 that is open externally. Preferably rewind shaft 18 is made of a hard plastic easily machinable material.

Collar 22, between the bores 23 and 24, is formed with an outwardly facing radial flat surface 25 which is annular surrounding bore 23 and is perpendicular to the axis of rotation of shaft 18. This surface 25 serves as a thrust bearing surface for at least in part supporting the enlarged cylindrical head 26 of the rewind shaft. The outer diameter of head 26 is such as to fit snugly rotatably within the outer bore 24. At its lower end the rewind shaft is formed with a transverse slot 27 which is within the camera adapted to couple positively with the spindle of the cartridge containing the unexposed film.

The rewind shaft is formed internally with a bore 28 which is substantially rectangular or square in cross section, at least being non-circular, and in the preferred embodiment it has the cross section illustrated best in FIGURES 5 and 6 wherein two flat parallel opposed side walls 29 and 31 are connected by two oppositely curved side walls 32 and 33. Curves 32 and 33 lie in the same circle. At the portion indicated at 34, the shaft bore assumes the cylindrical shape of curves 32 and 33 and is internally threaded for receiving a stop screw 35 that is adjustable axially within the shaft 18 for a purpose to appear. Above screw 35 a crank stop member 36 is axially slidably mounted in bore 28. As shown in FIGURE 6 this stop member 36 is essentially rectangular in lateral cross section and has flat sides slidably snugly engaging flat walls 29 and 31 of the bore 28. The lower end of crank stop 36 is flanged at 37 so that the flange 37 has the exact shape of the bore 28 with flat sides engaging walls 29 and 31 of the bore and arcuate sides slidably engaging surfaces 32 and 33 within the bore.

For economy of space, stop 36 is internally recessed at its lower end to provide a cylindrical bore 38 into which extends a stop pin 39 rigid with screw 35 and disposed exactly centrally of the bore 38 and on the axis of rotation of the shaft 18. A coil spring 41 has a small diameter upper portion disposed within the recess 38 surrounding pin 39 and abutting at its upper end against the bottom face 42 of blind bore 38. The lower end of the spring assembly 41 is of larger diameter surrounding pin 39 and abuts against the upper flat surface of the adjustable stop screw 35. In the assembly spring 41 is compressed axially of the shaft 18 and the dimension of the spring is such that it preferably does not allow the stop screw to be advanced sufficiently to become actually solid between the stop screw and the flange 37 for purposes to appear. Compressed spring 41 permits pin 39 to bottom in bore 38 and urges stop 36 axially outwardly.

At its upper end stop 36 is formed with a flat sided reduced terminal section 43 (FIGURE 6) through which projects a pivot pin assembly 44 at right angles to the axis of shaft 18.

In the upper part of bore 28 there is axially slidably mounted a rewind crank assembly which comprises a crank member 45 having its shank 46 slidably disposed in bore 28 and having the same shape in cross-section essentially as stop 36. The lower end of shank 46 is bifurcated (FIGURE 6) to provide a slot 47 that slips over the flat terminal 43 of stop 36 and through which passes the opposite ends of pin 44. This provides a special pivotal connection between the crank and the stop member 36 which will be described in connection with FIGURE 8.

At the upper end of head 26 of the shaft 18 there is formed a radial slot 48 which is open to the periphery and to the top of the head and intersects the top of the bore 28. Slot 48 is substantially rectangular in cross-section as shown in FIGURE 7. The upper end of rewind crank 45 is an angularly extending preferably cylindrical rigid post 49 which, when the crank is retracted within the camera, lies within the slot 48 as shown in FIGURES 3 and 7.

Rewind crank 45 is slotted at 51 along the side surface opposite to the direction that post 49 projects as shown in FIGURE 5. This slot 51 is flat-sided, and disposed within it is a crank release lever 52 pivoted at 53 within the enlarged lower end of the slot 51. Since the slot 51 is flat-sided the pivoted member 52 may rock essentially only in the plane of the paper in FIGURE 3.

At its upper end lever 52 is formed with a head 54 which in the retracted position of the crank extends slightly above the top surface of head 26. A slight distance downwardly from the open top end of slot 51 an internal recess 55 coaxial with post 49 is formed in which is seated a coil spring 56 which is compressed between the bottom of recess 55 and the inner side of lever 52 to normally bias that lever counterclockwise in FIGURE 3. Counterclockwise movement of lever 52 is arrested by abutment of shoulder 57 on lever head 54 with the abutment surface 57' on crank shank 46 as shown in FIGURE 5A.

Within the upper part of bore 28 is formed a shoulder 58 that faces axially downwardly toward the pivot point of the lever 52. In turn lever 52 is formed with a projection 59 that in the biased limit leftward counterclockwise position of lever 52 shown in FIGURE 3 engages under shoulder 58 to thereby hold the crank assembly 45 against axial ejection from the camera by spring 41.

At the inner end of slot 51 where it intersects the bore 28 a downwardly axially facing shoulder 61 is provided, and the purpose of shoulder 61 is to lie in the path of flange 37 and prevent the stop member 36 from being pulled out of the bore when the crank has been ejected for operation, as will appear.

A rigid projection 50 is formed on the upper surface of head 26 and this has a flat surface 53 aligned with one side of slot 48 adapted to engage the crank during the rewind operation as shown in FIGURE 4.

Referring to FIGURE 8 the lower edge 60 of crank shank 46 is essentially parallel to the ledge 63 on stop 36 with a sharp corner at 64 to engage the ledge 63 if it is attempted to rock crank 45 clockwise and with a rounded corner 65, which when the crank 45 is rocked counterclockwise, will clear the ledge 63 and permit the crank to assume a position extending at right angles to the axis of shaft 18 shown at B in FIGURE 3.

Shaft 18 is freely rotatably mounted in bore 17 and is maintained against axial outward displacement in bore 17 by a bearing ring 66 which is flat sided and rotatably seats on an upwardly facing annular smooth body surface 67 surrounding the bore. Internally ring 66 is formed with a series of axial teeth 68 which are relatively sharp edged to bite into the periphery of shaft 18. In assembly shaft 18 is thrust into collar 22 and the ring 67 is pushed onto it from the side opposite head 26 until the ring 67 substantially slidably engages the adjacent flat surface of collar 22. Then teeth 68 are locked into the periphery of shaft 18 so that essentially ring 67 becomes a radial flange rigid with shaft 18. Then the assembly of collar 22 and shaft 18 is secured to the body by screws 21.

FIGURES 9 and 10 show the rewind shaft assembly mounted in another camera having a top wall 71 formed with concentric large and small bores 72 and 73 and an outwardly facing annular smooth bearing shoulder 74. Head 26 of the assembly rotatably seats on surface 74, and shaft 18 is rotatable within bore 73. The crank mounting and stop 36 are the same as in FIGURE 3.

Shaft 18 is externally formed with axially spaced parallel peripheral grooves 75 and 76. These grooves have no function in the camera of FIGURES 1–8 but they serve to locate shaft 18 in two different axial positions in FIGURE 9. A depending flange 77 surrounds bore 73 and this flange is removed on a sector slot 78. A spring pin 79 in slot 78 is anchored at one end at 81 and traverses the adjacent portion of groove 73 in the illustrated position of FIGURE 9 to releasably lock shaft 18 axially in that position.

When the crank is ejected as in the foregoing embodiment it is possible to pull shaft 18 axially outwardly. Outward axial pull on the shaft cams the spring 79 outwardly as shown in dotted lines in FIGURE 10, and the spring 79 snaps into groove 76 to lock the shaft axially in the outer position. Note that the shapes of grooves 75 and 76 are the same but reversed so that their camming action on the spring 79 is performed readily in the proper direction. This outward shift of shaft 18 is important where it is necessary to provide space for insertion of the cartridge into the camera.

In operation the crank rewind parts in both embodiments are normally disposed as illustrated in FIGURE 3. After the film has been exposed and it is desired to rewind the film within the cartridge driven by the clutch end 27 of the shaft 18, the crank rewind is projected exteriorly of the assembly to the position illustrated in FIGURE 4 where it is available for manipulation. This is accomplished by pressing slightly to the right on the lever head 54 in FIGURE 3 to unlatch the projection 59 from under the shoulder 58, this being accomplished by swinging movement of lever 52 against the action of spring 56. When crank 45 is so released this permits spring 41 to project the crank assembly along bore 28 and a substantial distance externally of the camera. The operator grasps the post 49 and pulls the crank assembly outwardly of the bore 28 until the pivot 44 clears the top surface of the head 26 and flange 37 encounters stop 61. Then he rocks the crank 45 from the position A of FIGURE 3 to the position B where it overlies the top surface of head 26 and is in abutment with the face 53. The projection 50 is in the form of an arrow and points the direction of turning of the crank (FIGURE 4) for rewinding the exposed film within the cartridge driven shaft 18. When the parts are retracted as in FIGURE 3 spring 41 urges the latch projection 59 tightly against shoulder 58.

During assembly the axial retracted position of the crank 45 within the bore 28 is determmined by adjustment of member 35 which also acts as the lower abutment for the compression spring 41 that serves to eject the crank partially out of the camera. This position can be adjusted to suit dimensional requirements so that no special tolerance is needed in locating shoulder 58.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a hollow rewind shaft assembly having a head end and a film spindle drive end, a member slidably and non-rotatably mounted in said shaft assembly, means resiliently biasing said member axially outwardly of said assembly, a crank pivoted to said member and normally disposed within said shaft assembly adjacent the head end, resiliently biased means for latching said crank within said shaft assembly, means at said head end of the shaft assembly for releasing said latching means and enabling the resilient biasing means of said member to project the crank from said shaft assembly, means enabling said crank and member to be pulled sufficiently outwardly of said shaft assembly to a position whereby said crank may be pivoted on said member to an angular shaft assembly rotating position, and axially adjustable stop means for said member and said resilient biasing means in the bore of said shaft assembly.

2. In a camera having a top wall formed with a bore, a rigid collar surrounding said bore on the top wall of said camera, a rewind shaft assembly journalled in said bore and having an enlarged head rotatably seated within said collar, an articulated crank for rotating said shaft assembly normally housed within a recess in said shaft assembly and means for latching it within said recess, said enlarged head having a transverse outwardly open slot in which the outer end of said crank is disposed when latched within said recess, means within the recess automatically operative when the crank is unlatched for projecting the crank at least partially outwardly of said shaft assembly and enabling the crank to be grasped by the operator and moved to a position where it may be manipulated to turn said shaft assembly about its axis.

3. A rewind shaft assembly for a camera comprising a hollow shaft having a shank adapted to be rotatably mounted in the camera and an enlarged head, said shank being adapted at its end opposite the head for drive connection with a film spindle within the camera, said shank being formed with a bore, a stop at the bottom of said bore, a member slidably and non-rotatably mounted within said bore and adapted to seat against said stop, spring means compressed between said member and said stop, a crank pivoted to said member and having a shank adapted to be non-rotatably and slidably disposed in said bore and a laterally extending post adapted to seat within a corresponding recess in said head, and a latch lever pivoted on said crank and adapted to coact with a stop in said bore to hold said crank in retracted position within said bore, said spring means being effective upon disengagement of said latch lever and its associated stop to project said crank out of said bore.

4. In the assembly defined in claim 3, said stop at the bottom of said bore being axially adjustable.

5. In the assembly defined in claim 3, means in the pivot connection between the crank and said member for enabling pivotal movement of said crank only in the direction away from said recess in the head of said shaft.

6. In the assembly defined in claim 3, said latch lever being spring biased toward the associated stop.

7. In a camera having a body wall formed with a bore, said wall having an annular flat face surrounding said bore, a rewind shaft assembly having a shank journalled in said bore and an enlarged head, a collar rigid with said body wall and within which said head is rotatably seated, said collar having an annular flat inner end face surrounding said shank, flat radial flange means on said shank engaging the underside of said collar, and means securing said collar on said wall with said flange means rotatably engaging said wall and collar faces.

8. In combination, a hollow rewind shaft assembly having an outer end and an inner film spindle driving end, a member slidably and non-rotatably mounted in said shaft assembly, means resiliently biasing said member axially outwardly of said assembly, a crank lever directly pivoted to said member and normally disposed mainly within said shaft assembly adjacent said outer end, means for latching said crank lever within said shaft assembly comprising a catch lever which is pivoted to said crank lever, means at the outer end of the shaft assembly for moving said catch lever for releasing said latch means and enabling the resilient biasing means of said member to project the crank lever from said shaft assembly, and means enabling said crank lever and member to be pulled sufficiently outwardly of said shaft assembly to a position whereby said crank lever may be pivoted on said member to an angular shaft assembly rotating position.

9. In combination, a hollow rewind shaft assembly having a clutch formation at its inner end for a drive coupling to a film spindle assembly, a member slidably and non-rotatably mounted in said shaft assembly, means resiliently biasing said member axially outwardly of said assembly, a crank lever pivoted to said member and normally disposed chiefly within said shaft assembly, means for latching said crank lever within said shaft assembly comprising a release lever pivotally mounted within the crank lever and resiliently biased laterally outwardly with respect to said crank lever, means at the outer end of the shaft assembly for shifting said release lever to release said latching means and enable the resilient biasing means of said member to project the crank lever from said shaft assembly, and means enabling said crank lever and member to be pulled sufficiently outwardly of said shaft assembly to a position whereby said crank lever may be pivoted on said member to an angular shaft assembly rotating position.

10. In the combination defined in claim 9, said latching means also comprising axially facing frictionally engageable abutments on said shaft assembly and release lever.

11. A rewind shaft assembly for a camera comprising a hollow shaft having a shank adapted to be rotatably mounted in the camera and an enlarged head, said shank being adapted at its end opposite the head for drive connection with a film spindle within the camera, said shank being formed with a bore, a member slidably and non-rotatably mounted within said bore, spring means compressed between said member and an axially rigid part within the bore, a crank lever pivoted to said member and having a shank adapted to be non-rotatably and slidably disposed in said bore and a manual handle part adapted to seat within a corresponding recess in said head, and a laterally spring biased latch lever pivoted on said crank lever and adapted to coact with a fixed stop in said bore to hold said crank lever in retracted position within said bore, said spring means being effective upon disengagement of said latch lever and its associated stop to project said crank lever out of said bore.

12. In a camera, a rotatably mounted hollow rewind shaft assembly having an enlarged outer end and formed at its inner end for drive connection to a film spindle so that rotation of the shaft assembly will rotate the spindle, an articulated handle for rotating said shaft assembly normally housed substantially entirely within said shaft assembly, said handle comprising an inner section slidably and non-rotatably mounted in said shaft assembly, an outer section pivoted to said inner section, and a projection on said outer handle section fitting into a recess in said enlarged end when the handle is retracted within the shaft assembly and forming a manual operating crank when the handle is projected axially outwardly of said shaft assembly, means enabling said projected articulated handle to be pulled sufficiently outwardly of said shaft assembly to a position where said outer section may be pivoted on said inner section to an angular shaft assembly rotating position, means for releasably latching said handle in retracted position within the shaft assembly, means for releasing said latching means comprising an operator therefor accessible at the enlarged end of said shaft assembly, and spring means energized by movement of said handle to retracted position within said shaft assembly effective upon release of said latching means for automatically at least partially ejecting said handle axially outwardly of said shaft assembly.

References Cited in the file of this patent

UNITED STATES PATENTS

| | | |
|---|---|---|
| 1,247,911 | Walkup | Nov. 27, 1917 |
| 1,868,580 | McKinney | July 26, 1932 |
| 1,999,457 | Hoehn | Apr. 30, 1935 |
| 2,245,214 | Mihalyi | June 10, 1941 |
| 2,486,586 | Brittain et al. | Nov. 1, 1949 |
| 2,496,737 | McCallick et al. | Feb. 7, 1950 |
| 2,880,661 | Kaden et al. | Apr. 7, 1959 |